Nov. 10, 1959  F. R. FALKNER  2,912,274
CAMPING TRAILER
Filed Jan. 24, 1958  4 Sheets-Sheet 2

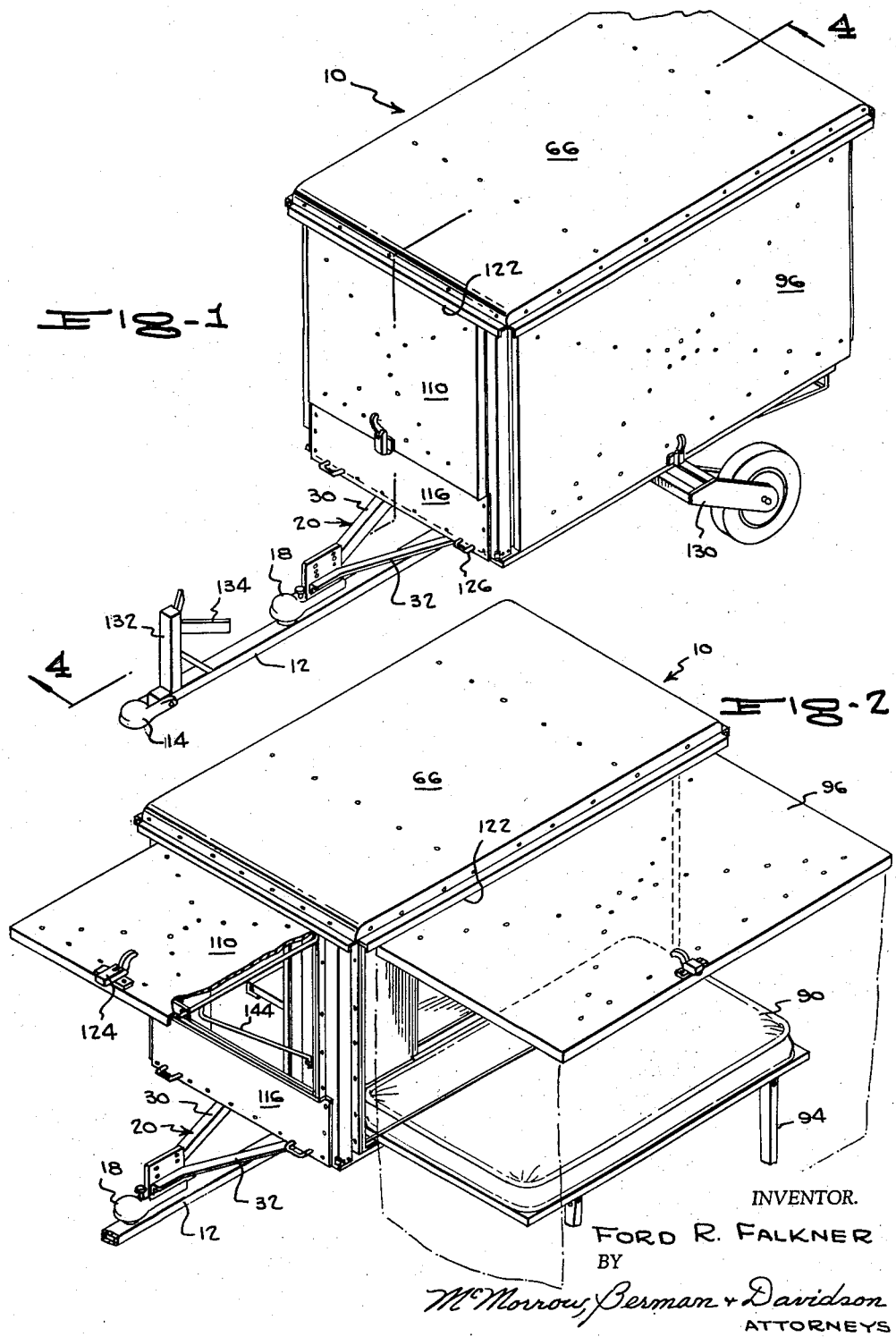

INVENTOR.
FORD R. FALKNER
BY
McMorrow, Berman & Davidson
ATTORNEYS

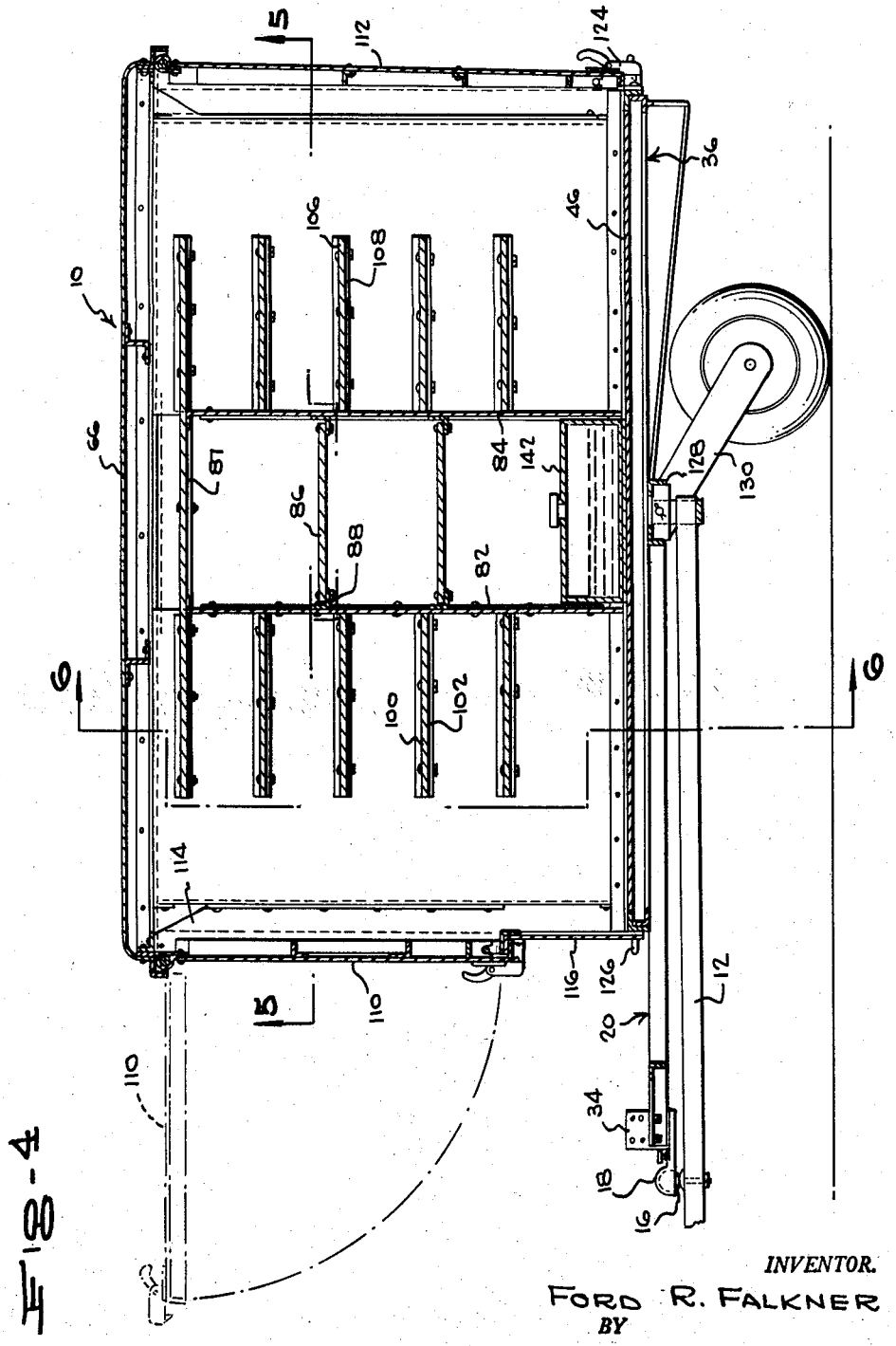

Nov. 10, 1959      F. R. FALKNER      2,912,274
CAMPING TRAILER
Filed Jan. 24, 1958      4 Sheets-Sheet 4
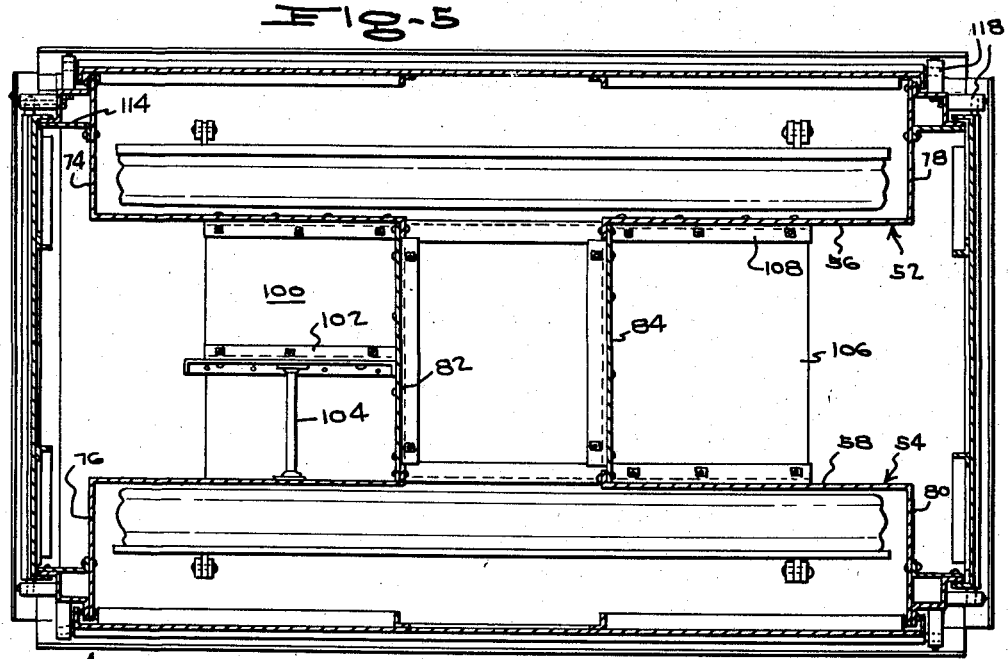
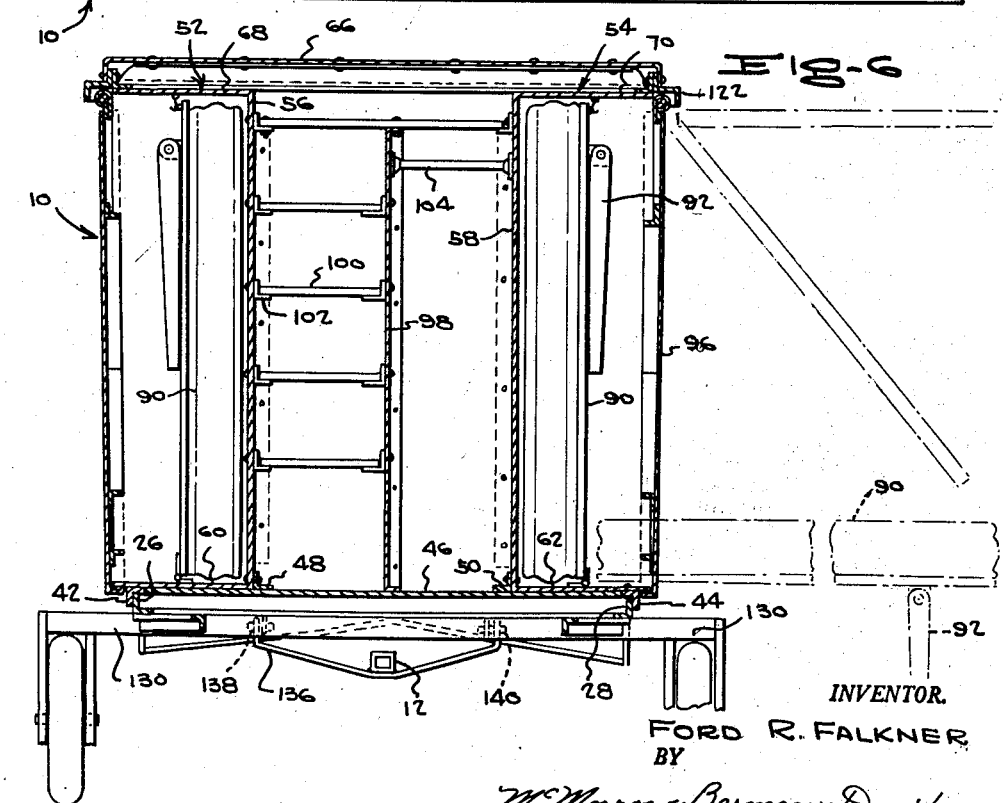
INVENTOR.
FORD R. FALKNER
BY
McMorrow, Berman & Davidson
ATTORNEYS

United States Patent Office 2,912,274
Patented Nov. 10, 1959

2,912,274

CAMPING TRAILER

Ford R. Falkner, Midland, Tex., assignor of one-half to E. E. Bradford, San Angelo, Tex.

Application January 24, 1958, Serial No. 711,086

4 Claims. (Cl. 296—23)

The present invention relates to a camping trailer.

An object of the present invention is to provide a camping trailer which lends itself to ready transport behind a towing vehicle when in the closed or nested condition.

Another object of the present invention is to provide a camping trailer which lends itself to ready accessibility of all of its components and contents when in the open and expanded condition.

A further object of the present invention is to provide a camping trailer which is easily and quickly converted from the closed condition for transport to the open and expanded condition for use.

A still further object of the present invention is to provide a camping trailer which is compact in size, one which provides for ready storage of camping equipment, one which is sturdy in construction, and one which is economically feasible.

These and other objects and advantages of the present invention will be fully apparent from the following description when taken in conjunction with the annexed drawings, in which:

Figure 1 is an isometric view of the camping trailer according to the present invention in the closed or nested condition with the auxiliary tongue attached ready for transport behind a towing vehicle;

Figure 2 is an isometric view of the assembly shown in Figure 1 with one side and one end of the trailer converted from the closed condition to the open and expanded condition, the dotted line showing indicating a curtain around one of the bed assemblies;

Figure 4 is a sectional view, on an enlarged scale, taken on the line 4—4 of Figure 1;

Figure 5 is a sectional view taken on the line 5—5 of Figure 4; and

Figure 6 is a sectional view taken on the line 6—6 of Figure 4.

Figure 3:
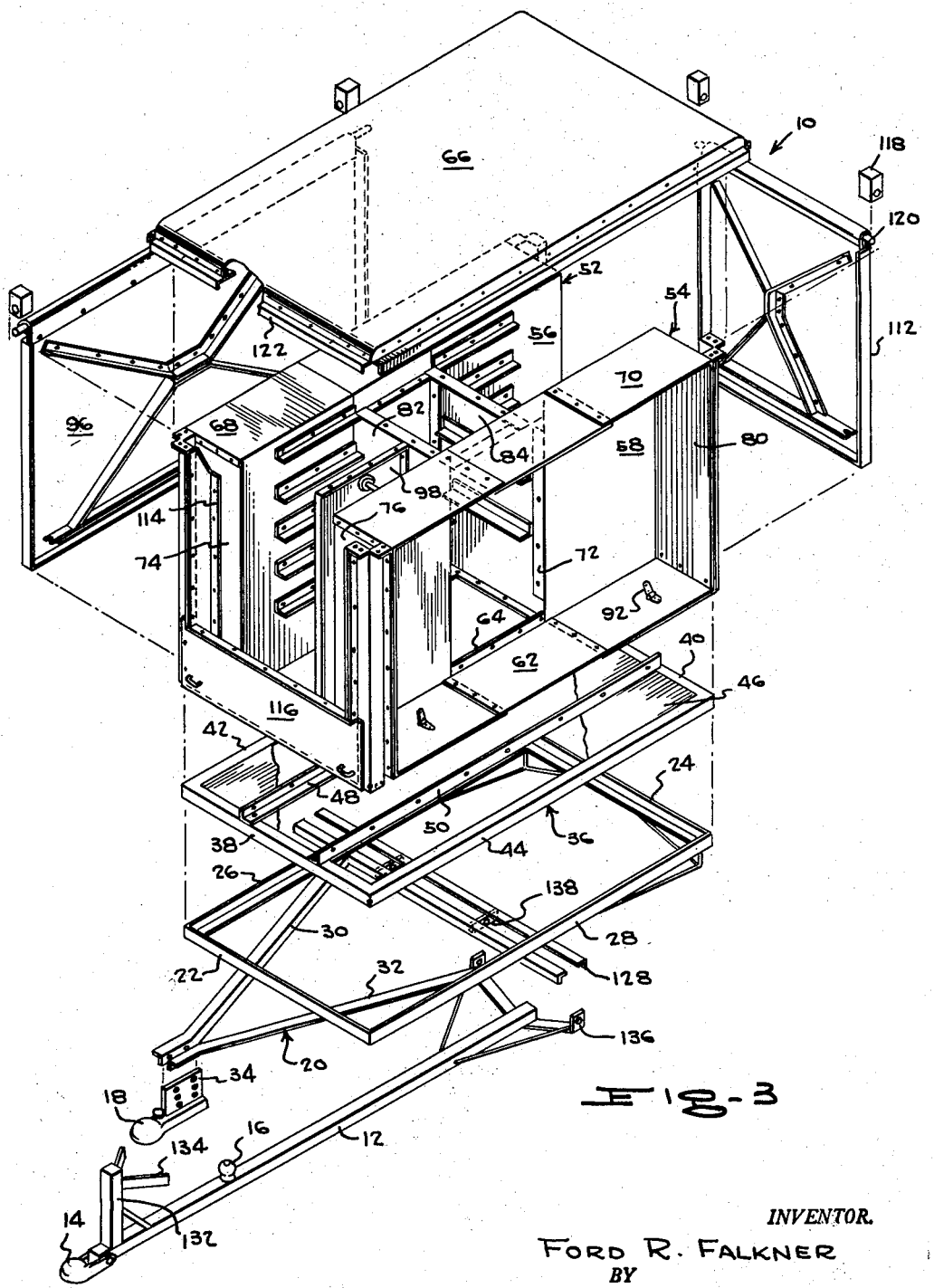
Figure 3 is an isometric exploded view of the assembly shown in Figure 1 with one of the bed assemblies removed therefrom and with a fragment of the platform floor shown removed from the platform frame.

Referring in greater detail to the drawings in which like numerals indicate like parts throughout the several views, the reference numeral 10 designates the camping trailer according to the present invention, the trailer 10 including an auxiliary tongue member 12 having a hitch component 14 on one end thereof for attachment to a towing vehicle. Another hitch component 16 is positioned intermediate the ends of the auxiliary tongue member 12 and rises from the upper side of the latter and is adapted for connection to a further hitch component 18 carried on the forward end of a frame 20.

The frame 20 includes a forward end member 22, a rearward end member 24, a pair of side members 26 and 28 connecting the adjacent ends of the forward and rearward end members together and diagonal tongue members 30 and 32 arranged in converging relation and extending from the midportions of the side members 26 and 28 to a point spaced forwardly of the forward end member 22 where they are adjustably connected to a vertically extending plate 34 secured to the hitch component 18.

As shown in Figure 3, the upwardly extending flanges of the forward end member 22, the rearward end member 24 and of the side members 26 and 28 form a support for the horizontally extending flanges of the end and side members of a platform frame designated generally by the reference numeral 36, also seen in Figure 3 in exploded superimposed relation with respect to the frame 20.

The platform frame 36 has end members 38 and 40 constituting forward and rearward edges of a platform and side members 42 and 44 constituting side edges of such platform. A floor panel 46 fills the spaces between the end members 38 and 40 and the side members 42 and 44 and a pair of stringer members 48 and 50 overlie the floor panel 46 and extend between the end members 38 and 40 and reinforce the platform thus formed.

A shallow four-sided open ended receptacle 52 disposed so that the open ends face vertically inwardly and outwardly respectively is positioned so that the outwardly facing open end extends along the side edge of the platform contiguous to the side member 42 of the platform frame 36 and another receptacle, identical with the receptacle 52, and designated by the reference numeral 54, is positioned along the side edge of the platform contiguous with the other of the side members 44. The inwardly facing open ends are closed by plates 56 and 58, and the plates 56 and 58, respectively, of the receptacles 52 and 54 are remote from the side edges of the platform and the lower side of each of the receptacles extends from the forward edge to the rearward edge of the platform thus described.

The lower sides 60 and 62 of the receptacles 52 and 54 are fixedly secured to the adjacent portions of the platform by means of bolts, welding, or other conventional means, each of the lower sides having a central portion with a turned-up edge as at 64 fixedly secured to the adjacent portion of the respective stringer member 48 or 50, as shown in Figure 3.

A roof 66 extends over and is fixedly attached to the upper sides 68 and 70 of the receptacles 52 and 54, respectively. Each of the plates 56 and 58 of the receptacles 52 and 54 is provided with an opening, as at 72, with respect to the plate 58 in Figure 3, the openings extending vertically from the lower sides 60 and 62 of the receptacles to the upper sides 68 and 70 and intermediate the vertically disposed sides 74 and 76 which are adjacent the forward edge of the platform and the vertically disposed other sides 78 and 80 which are adjacent the rearward edge of the platform. The openings in the plates 56 and 58 are in registry with each other.

Vertically disposed partitions 82 and 84 extend between the adjacent vertical walls of the openings in the receptacle plates 56 and 58 and are fixedly secured to the adjacent portions of those plates 56 and 58 and to the floor panel 46 of the platform frame 36. The partitions 82 and 84 extend upwardly to the angle support of a top shelf 87 thereby providing further support to the shelf 87 along the angle supports for such shelf and form with the adjacent portion of the platform floor panel 46 and the top shelf an upstanding open-ended cupboard.

A plurality of shelves 86 are arranged in vertical spaced relation and positioned within the cupboard thus formed so that they extend from one end to the other of the open ends of such cupboard, the shelves 86 being fixedly supported upon the partitions 82 and 84, each shelf being carried on the horizontal flange of an angle member as at 88 in Figure 4.

A bed frame and mattress assembly 90, conformably shaped to fit within each of the receptacles 52 and 54, is positioned in each receptacle so that it is in an upright position and wholly housed within the receptacle with the bed frame of the assembly facing toward and bridging the outwardly facing open end of the receptacle. In Figure 3, the bed frame and mattress assembly is removed from the receptacle 54 exposing the pair of hinges 92 which are used to connect the lower side 62 of the receptacle 54 to the bed frame and mattress assembly 90 from the full line position or upright position shown in Figure 6 to the dotted line or horizontal position projecting out of the outwardly facing open end of the receptacle 54. The bed frame and mattress assembly 90 within the receptacle 52 is similarly connected and similarly shiftable from the upright position to a horizontal position. Folding legs 92 are attached to each of the bed frames of the assemblies 90 and swing to a vertical position beneath and supporting the assemblies 90 when the latter have been shifted to their horizontal positions.

A vertically disposed side panel 96 normally extends over the outwardly facing open end of each of the receptacles 52 and 54 and is connected to the upper sides 68 and 70, respectively, for movement from the vertical position shown in full lines in Figure 6 with respect to the side panel 96, covering the receptacle 54, to a horizontal overhead position as shown in Figure 2.

The partition 82 contiguous to the forward edge of the platform formed by the floor panel 46, together with a longitudinally extending other partition 98 which projects from the partition 82 together with the adjacent portion of the bottom 56 of the receptacle 52 and the adjacent portion of the floor panel 46 forms a first storage space. A plurality of shelves 100 project forwardly from the partition 82 and are supported upon angle members 102 which are fixedly secured to the adjacent portion of the bottom 56 and to the one face of the partition 98. The space between the partition 98 and the adjacent portion of the receptacle plate 58, together with the remaining part of the partition 82 forms a further storage space across which extends a clothes pole 104 for the support thereon of conventional clothes hangers, the latter not being shown as not being a part of the present invention.

Similarly, the partition 84, together with the adjacent parts of the plates 56 and 58 and the adjacent portion of the floor panel 46 forms a further or second storage space having horizontally disposed shelves 106 supported on angle members 108 which are carried on the plates 56 and 58.

A vertically disposed end panel 110 normally extends over the upper end portion of the vertically disposed receptacle sides 74 and 76 contiguous to the forward end of the platform formed by the floor panel 46 and the platform frame 36. Another end panel 112 is similarly positioned with respect to the receptacle sides 78 and 80 contiguous to the rearward end of the platform. The end panels 110 and 112 are connected to reinforcing members 114 which are carried by the adjacent sides 74, 76, 78, and 80 for swinging movement from the vertical position shown in Figure 4 in full lines to overhead horizontal positions, as shown in dotted lines, with respect to the end panel 110.

Below the end panel 110 is a half panel 116 closing the remainder of the open end of the space between the adjacent portions of the receptacles 52 and 54. Bearing blocks 118 are carried on the webs of each of the reinforcing members 114 for the support of the adjacent side panels 96 and end panels 110 and 112. Projecting pins 120 are received in the adjacent bearing blocks and are carried in the end portions of each of such side panels and end panels as shown most clearly in Figure 3.

The roof 66 has an overhang as at 122 with respect to the end panel 110 making the joint between the roof 66 and such end panel weather-tight. Other overhangs 122 extend above each of the side panels 96 and above the other end panel 112.

Suitable latches 124 secure the end panels and side panels to the adjacent portions of the trailer 10 and are of conventional construction. Handles 126 project from the half-panel 116 and are used to manually shift the trailer 10 onto the frame 20 when desired.

A pair of transverse angle iron members 128 extend across the underside of the frame 20 intermediate the ends of the latter and are fixedly secured thereto. A wheel assembly 130 is carried on the projecting end portions of the members 128 on each side of the frame 20 and form the means by which the whole assembly is transported over a road surface behind a towing vehicle. A post 132 is carried on the forward end portion of the auxiliary tongue member 12 and carries outstanding wings 134 which form stops for a pleasure boat (not shown) when the latter is carried by the auxiliary tongue member 12 with the auxiliary tongue member 12 connected to the frame 20 and the platform 36 removed from the frame 20. The rearward end portion of the auxiliary tongue member 12 carries a transverse trunnion element 136 which is pivotally connected to longitudinally arranged bars 138 carried on the undersides of the members 128, there being provided a suitable pin for connecting the trunnions 136 to the bars 138, such pins being shown in dotted lines in Figure 6 and designated by the reference numeral 140.

In Figure 4 the reference numeral 142 represents a tank for a supply of water for use by the occupants of the trailer of the present invention.

In use, the trailer of the present invention is readily attached to and detached from a towing vehicle by means of the hitch component 14 or the hitch component 18 if the auxiliary tongue member 12 is detached from the frame 20 by removing the pins 140. The frame 20 may be towed with or without the auxiliary tongue 12. When the auxiliary tongue 12 is attached to the frame 20, the hitch component 18 may be disconnected from the hitch component 16 thereby allowing the frame 20 to tilt about the pins 140 as horizontal axes and the rearward end of the trailer 10 to be lowered to the ground for ready detachment of the platform 36 from the frame 20. With the platform 36 removed from the auxiliary tongue member 12, the frame 20 may be used as a trailer for a boat, if desired.

When the trailer is to be occupied the side panels 96 are first raised and secured by suitable braces and the end panels 110 and 112 are also raised to the horizontal position and secured by suitable braces, one of which is shown in Figure 2 and designated by the reference numeral 144. The bed frame and mattress assemblies 90 are then lowered to the horizontal position with the legs 94 supporting them upon the ground surface. Access may be had to the shelves 100, 106 and to the articles stored within the storage spaces defined by the partitions 82 and 84 and the adjacent parts of the receptacle plates 56 and 58.

It will be seen that all of the contents of the trailer of the present invention are readily accessible to the occupants or users thereof without unnecessary unloading of the trailer body.

What is claimed is:

1. In a camping trailer, a platform having a pair of side edges, a forward edge and a rearward edge, a shallow four-sided open ended receptacle disposed so that the open ends face vertically inwardly and outwardly respectively is positioned so that it extends along each of the platform side edges with the outwardly facing open end adjacent the side edge, the inwardly facing open end remote from the side edge, and the lower side extending from the forward edge to the rearward edge of said platform, the lower sides of said receptacles being fixedly supported on the platform, a roof extending over and fixedly attached to the upper sides of said receptacles, each of the inwardly facing open ends being closed by a plate having an opening extending vertically from the upper side to the lower side intermediate the side adjacent the forward and rearward edges of the platform, the openings being in registry with each other, a vertically disposed partition extending between adjacent vertical walls of said openings and fixedly secured to the adjacent portions of said receptacle plates and platform, said partitions forming with the portion of the platform therebetween an upstanding open-ended cupboard, a plurality of shelves arranged in vertically spaced relation positioned within said cupboard so that they extend from one to the other of the open ends of said cupboard and fixedly supported on said partitions, and a bed frame and mattress assembly conformably shaped to fit within each of said receptacles positioned in each of said receptacles so that it is in an upright position and wholly housed within the receptacle with the bed frame facing toward and bridging the outwardly facing open end of the receptacle and having the bed frame connected to the lower side of the adjacent receptacle for movement from the upright position to a horizontal position projecting out of the outwardly facing open end of said receptacle.

2. In a camping trailer a platform having a pair of side edges, a forward edge and a rearward edge, a shallow four-sided open ended receptacle disposed so that the open ends face vertically inwardly and outwardly respectively is positioned so that it extends along each of the platform side edges with the outwardly facing open end adjacent the side edge, the inwardly facing open end remote from the side edge, and the lower side extending from the forward edge to the rearward edge of said platform, the lower sides of said receptacles being fixedly supported on the platform, a roof extending over and fixedly attached to the upper sides of said receptacles, each of the inwardly facing open ends being closed by a plate having an opening extending vertically from the upper side to the lower side intermediate the sides adjacent the forward and rearward edges of the platform, the openings being in registry with each other, a vertically disposed partition extending between adjacent vertical walls of said openings and fixedly secured to the adjacent portions of said receptacle plates and platform, said partitions forming with the portion of the platform therebetween an upstanding open-ended cupboard, a plurality of shelves arranged in vertically spaced relation positioned within said cupboard so that they extend from one to the other of the open ends of said cupboard and fixedly supported on said partitions, a vertically disposed side panel normally extending over the outwardly facing open end of each of said receptacles and connected to the upper side of the adjacent receptacle for movement from the vertical position to a horizontal overhead position, and a bed frame and mattress assembly conformably shaped to fit within each of said receptacles positioned in each of said receptacles so that it is in an upright position and wholly housed within the receptacle with the bed frame facing toward and bridging the outwardly facing open end of the receptacle and having the bed frame connected to the lower side of the adjacent receptacle for movement from the upright position to a horizontal position projecting out of the outwardly facing open end of said receptacle after the adjacent panel has been moved to the overhead horizontal position.

3. In a camping trailer, a platform having a pair of side edges, a forward edge and a rearward edge, a shallow four-sided open ended receptacle disposed so that the open ends face vertically inwardly and outwardly respectively is positioned so that it extends along each of the platform side edges with the outwardly facing open end adjacent the side edge, the inwardly facing open end remote from the side edge, and the lower side extending from the forward edge to the rearward edge of the platform, the lower sides of said receptacles being fixedly supported on the platform, a roof extending over and fixedly attached to the upper sides of said receptacles, each of the inwardly facing open ends being closed by a plate having an opening extending vertically from the upper side to the lower side intermediate the sides adjacent the forward and rearward edges of the platform, the openings being in registry with each other, a vertically disposed partition extending between adjacent vertical walls of said openings and fixedly secured to the adjacent portions of said receptacle plates and platform, said partitions forming with the portion of the platform therebetween an upstanding open-ended cupboard, a plurality of shelves arranged in vertically spaced relation positioned within said cupboard so that they extend from one to the other of the open ends of said cupboard and fixedly supported on said partitions, the partition contiguous to the forward edge of said platform and the portions of the plates of said receptacles and the portions of the platform therebetween forming a first storage space and the partition contiguous to the rearward edge of said platform and the portions of the plates of said receptacles and the portion of the platform therebetween forming a second storage space, a plurality of shelves arranged in vertically spaced relation positioned within at least one of said storage spaces and supported on the adjacent portions of said receptacle plates, and a bed frame and mattress assembly conformably shaped to fit within each of said receptacles positioned in each of said receptacles so that it is in an upright position and wholly housed within the receptacle with the bed frame facing toward and bridging the outwardly facing open end of the receptacle and having the bed frame connected to the lower side of the adjacent receptacle for movement from the upright position to a horizontal position projecting out of the outwardly facing open end of said receptacle.

4. In a camping trailer, a platform having a pair of side edges, a forward edge and a rearward edge, a shallow four-sided open ended receptacle disposed so that the open ends face vertically inwardly and outwardly respectively is positioned so that it extends along each of the platform side edges with the outwardly facing open end adjacent the side edge, the inwardly facing open end remote from the side edge, and the lower side extending from the forward edge to the rearward edge of the platform, the lower sides of said receptacles being fixedly supported on the platform, a roof extending over and fixedly attached to the upper sides of said receptacles, each of the inwardly facing open ends being closed by a plate having an opening extending vertically from the upper side to the lower side intermediate the sides adjacent the forward and rearward edges of the platform, the openings being in registry with each other, a vertically disposed partition extending between adjacent vertical walls of said openings and fixedly secured to the adjacent portions of said receptacle plates and platform, said partitions forming with the portion of the platform therebtween an upstanding open-ended cupboard, a plurailty of shelves arranged in vertically spaced relation positioned within said cupboard so that they extend from one to the other of the open ends of said cupboard and fixedly supported on said partitions, a vertically disposed side panel normally extending over the outwardly facing open end of each of said receptacles and connected to the upper side of the adjacent receptacle for movement from the vertical position to a horizontal overhead position, the partition contiguous to the forward edge of said platform and the portions of the plates of said receptacles and the portions of the platform therebetween forming a first storage space and the partition contiguous to the rearward edge of said platform and the portions of the plates of said receptacles and the portion of the platform therebetween forming a second storage space, a plurality of shelves arranged in vertically spaced relation positioned within at least one of said storage spaces and supported on the adjacent portions of said receptacle plates, a bed frame and mattress assembly conformably shaped to fit within each of said receptacles positioned in each of said receptacles so that it is in an upright position and wholly housed within the receptacle with the bed frame facing toward and bridging the outwardly facing open end of the receptacle and having the bed frame connected to the lower side of the adjacent receptacle for movement from the upright position to a horizontal position projecting out of the outwardly facing open end of said receptacle after the adjacent side panel has been moved to the overhead horizontal position, and a vertically disposed end panel normally extending over the vertically disposed receptacle sides adjacent each of said platform forward and rearward edges and connected to the adjacent portions of said receptacle upper sides for swinging movement from the vertical positions to horizontal overhead positions.

References Cited in the file of this patent

UNITED STATES PATENTS

| | | |
|---|---|---|
| 1,422,498 | Vint | July 11, 1922 |
| 1,578,390 | Brown | Mar. 30, 1926 |
| 2,678,442 | Ensor | May 11, 1954 |